(12) United States Patent
Abedini et al.

(10) Patent No.: US 9,327,245 B2
(45) Date of Patent: May 3, 2016

(54) METALLIC-CERAMIC COMPOSITE MEMBRANES AND METHODS FOR THEIR PRODUCTION

(76) Inventors: Sanam Abedini, Tabriz (IR); Nader Parvin, Tehran (IR); Parviz Ashtari, Karaj (IR)

( * ) Notice: Subject to any disclaimer, the term of this patent is extended or adjusted under 35 U.S.C. 154(b) by 1104 days.

(21) Appl. No.: 13/350,847

(22) Filed: Jan. 16, 2012

(65) Prior Publication Data

US 2012/0118815 A1    May 17, 2012

(51) Int. Cl.

| | |
|---|---|
| B01D 69/12 | (2006.01) |
| B01D 61/36 | (2006.01) |
| B01D 53/22 | (2006.01) |
| B01D 67/00 | (2006.01) |
| B01D 69/10 | (2006.01) |
| B01D 71/02 | (2006.01) |
| B22F 3/11 | (2006.01) |
| C22C 1/08 | (2006.01) |
| C23C 26/00 | (2006.01) |
| C23C 28/04 | (2006.01) |
| C23C 24/08 | (2006.01) |
| C23C 18/12 | (2006.01) |

(52) U.S. Cl.
CPC .............. *B01D 69/12* (2013.01); *B01D 53/228* (2013.01); *B01D 61/36* (2013.01); *B01D 67/0041* (2013.01); *B01D 67/0046* (2013.01); *B01D 67/0095* (2013.01); *B01D 69/105* (2013.01); *B01D 71/025* (2013.01); *B22F 3/1103* (2013.01); *B22F 3/1146* (2013.01); *C22C 1/08* (2013.01); *C23C 18/1216* (2013.01); *C23C 18/1225* (2013.01); *C23C 18/1241* (2013.01); *C23C 18/1254* (2013.01); *C23C 18/1283* (2013.01); *C23C 24/082* (2013.01); *C23C 26/00* (2013.01); *C23C 28/04* (2013.01); *B01D 2325/022* (2013.01); *B01D 2325/30* (2013.01); *B22F 2999/00* (2013.01)

(58) Field of Classification Search
None
See application file for complete search history.

(56) References Cited

U.S. PATENT DOCUMENTS

| | | | | |
|---|---|---|---|---|
| 4,770,908 | A | * | 9/1988 | Mori et al. ................. 427/376.2 |
| 6,117,341 | A | * | 9/2000 | Bray et al. .................... 210/791 |
| 2005/0067344 | A1 | * | 3/2005 | Tanaka et al. ................. 210/490 |
| 2006/0016332 | A1 | * | 1/2006 | Ma et al. ............................ 95/55 |
| 2007/0059514 | A1 | * | 3/2007 | Lee et al. ................... 428/312.2 |
| 2008/0290021 | A1 | * | 11/2008 | Buijs et al. ............... 210/500.27 |

* cited by examiner

*Primary Examiner* — Krishnan S Menon

(57) ABSTRACT

Metallic-ceramic composite membranes and methods for producing the metallic-ceramic composite membranes are disclosed. The metallic-ceramic composite membranes include the advantages of a metallic substrate relative to known ceramic substrates, such as high permeability, better mechanical properties, and corrosion resistance, and the advantages of a ceramic membrane, such as high permeability, high permselectivity, mechanic strength, and thermal stability. Therefore, a three-layer metallic-ceramic composite membrane, including a porous metallic substrate, a first, intermediate mesoporous γ-alumina membrane layer, and a second, top mesoporous γ-alumina membrane layer, is disclosed. Because of the high mechanical strength of the metallic-ceramic composite membrane and because the pores of the second mesoporous γ-alumina membrane have a narrow size distribution and average size of about 2.1 nanometers, the metallic-ceramic composite membrane can be used to separate gases, such as carbon dioxide ($CO_2$), in high-pressure environments.

9 Claims, 6 Drawing Sheets

METALLIC-CERAMIC COMPOSITE MEMBRANES AND METHODS FOR THEIR PRODUCTION

SPONSORSHIP STATEMENT

This application has been financially sponsored for international filing by the Iranian Nanotechnology Initiative Council and the Amirkabir University of Technology (Tehran Polytechnic).

TECHNICAL FIELD

This application generally relates to permeable membranes, and more particularly relates to metallic-ceramic composite membranes and methods for producing the metallic-ceramic composite membranes.

BACKGROUND

Membrane separation processes have been rapidly expanding in recent years. Composite membranes are typically made of a porous substrate covered with a membrane layer. The porous substrate provides mechanical strength without significantly reducing the flux through the membranes. Ceramic membranes made of γ-alumina have ion retention characteristics and, as such, have been used in various aqueous and gas separation applications. For example, γ-alumina is known to have a significant affinity for carbon dioxide ($CO_2$), which makes γ-alumina membranes suitable for carbon dioxide separation applications, such as, for example, steam reforming of hydrocarbons, coal gasification, partial oxidation of natural gas, and/or biomass gasification. However, the gas separation functions of γ-alumina membranes have not been well demonstrated because making a defect-free membrane with a predetermined structure remains a large material processing challenge. Therefore, new metallic-ceramic composite membranes and a new method for producing metallic-ceramic composite membranes using γ-alumina are needed.

SUMMARY

A method for producing a metallic-ceramic composite membrane is disclosed. Initially, a porous metallic substrate is received. Next, first mesoporous γ-alumina membrane made of gamma alumina powder is overlaid directly over the porous metallic substrate. Finally, a second mesoporous γ-alumina membrane made of aluminum tri-sec-butylate is overlaid directly over the first mesoporous γ-alumina membrane. The average pore size of the second mesoporous γ-alumina membrane is smaller than the average pore size of the first mesoporous γ-alumina membrane.

In some implementations, the porous metallic substrate can be a macroporous metallic substrate having pores with an average diameter greater than 10 micrometers. The porous metallic substrate can have a thickness of about two millimeters and can be made of austenitic stainless steel. In some implementations, the porous metallic substrate can be prepared by sintering austenitic stainless steel powder at a temperature above 1000° C.

In some implementations, to overlay the first mesoporous γ-alumina membrane over the porous metallic substrate, the porous metallic substrate can be initially soaked in a γ-alumina solution. Next, the surface of the porous metallic substrate soaked in the γ-alumina solution can be rolled to remove excess γ-alumina solution. The rolled porous metallic substrate soaked in the γ-alumina solution can be then dried in a heated environment and, finally, the dried porous metallic substrate can be calcined. The γ-alumina solution can be prepared by mixing gamma alumina powder, polyvinyl alcohol, and distilled water. The rolled porous metallic substrate soaked in the γ-alumina solution can be dried at a temperature of about 70° C. The dried porous metallic substrate can be calcined at a temperature above 500° C.

In some implementations, to overlay the second mesoporous γ-alumina membrane made of aluminum tri-sec-butylate directly over the first mesoporous γ-alumina membrane, the porous metallic substrate overlaid with the first γ-alumina membrane can initially be soaked in a colloidal Boehmite solution. The soaked porous metallic substrate can then be dried in a heated environment and, finally, the dried porous metallic substrate can be sintered. To prepare the colloidal Boehmite solution, an aluminum tri-sec-butylate precursor can be initially mixed with distilled water. Next, the mixture of the aluminum tri-sec-butylate precursor and distilled water can be heated and an acid can be added to the heated mixture to peptize the mixture. Finally, polyvinyl alcohol can be added to the peptized mixture. The peptized mixture can be filtered though at least one filter having pores smaller than 0.5 μm and the acid can be nitric acid. The soaked porous metallic substrate can be dried at a temperature less than 50° C. and the dried porous metallic substrate can be sintered at a temperature above 500° C.

Another method for producing a stainless steel-γ-alumina composite membrane is also disclosed. Initially, a macroporous austenitic stainless steel substrate is received. Next, the macroporous austenitic stainless steel substrate is soaked in a γ-alumina solution including gamma alumina powder, polyvinyl alcohol, and distilled water. The surface of the macroporous austenitic stainless steel substrate soaked in the γ-alumina solution is then rolled to remove excess γ-alumina solution. The rolled macroporous austenitic stainless steel substrate soaked in the γ-alumina solution is then dried in a heated environment and the dried macroporous austenitic stainless steel substrate is calcined. Next, the calcined macroporous austenitic stainless steel substrate overlaid with the first γ-alumina membrane is then soaked in a colloidal Boehmite solution including aluminum tri-sec-butylate precursor, distilled water, an acid, and polyvinyl alcohol. The soaked macroporous austenitic stainless steel substrate is then dried in a heated environment and, finally, the dried macroporous austenitic stainless steel substrate is sintered.

In some implementations, the macroporous austenitic stainless steel substrate can have a thickness of about two millimeters. To prepare the colloidal Boehmite solution, an aluminum tri-sec-butylate precursor can be initially mixed with distilled water. Next, the mixture of the aluminum tri-sec-butylate precursor and distilled water can be heated and an acid can be added to the heated mixture to peptize the mixture. Finally, polyvinyl alcohol can be added to the peptized mixture.

A three-layer metallic-γ-alumina composite membrane is also disclosed. The three-layer metallic-γ-alumina composite membrane includes a macroporous metallic substrate, a first mesoporous γ-alumina membrane made of gamma alumina powder overlaid directly over the macroporous metallic substrate, and a second mesoporous γ-alumina membrane made of aluminum tri-sec-butylate overlaid directly over the first mesoporous γ-alumina membrane. The average pore size of the second mesoporous γ-alumina membrane is smaller than the average pore size of the first mesoporous γ-alumina membrane. In some implementations, the macroporous metallic substrate can be a macroporous austenitic stainless steel substrate.

Details of one or more implementations and/or embodiments of the metallic-ceramic composite membranes and the methods for producing the metallic-ceramic composite membranes are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

Metallic-ceramic composite membranes and methods for producing the metallic-ceramic composite membranes are disclosed. The metallic-ceramic composite membranes include the advantages of a metallic substrate relative to known ceramic substrates, such as high permeability, better mechanical properties, and corrosion resistance, and the advantages of a ceramic membrane, such as high permeability, high permselectivity, mechanic strength, and thermal stability. Therefore, a three-layer metallic-ceramic composite membrane, including a porous metallic substrate, a first, intermediate mesoporous γ-alumina membrane layer, and a second, top mesoporous γ-alumina membrane layer, is disclosed. Because of the high mechanical strength of the metallic-ceramic composite membrane and because the pores of the second mesoporous γ-alumina membrane have a narrow size distribution and average size of about 2.1 nanometers, the metallic-ceramic composite membrane can be used to separate gases, such as carbon dioxide ($CO_2$), in high-pressure environments. Because of the corrosion resistance of the metallic substrate, the metallic-ceramic composite membranes can be used in toxic and/or hazardous environments, such as wastewater treatment facilities.

Figure 1:
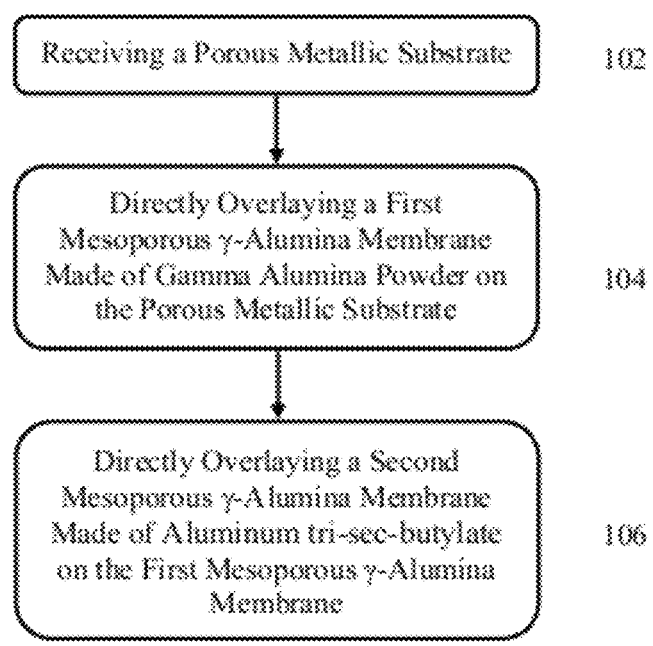
FIG. 1 illustrates an example of a method for producing metallic-ceramic composite membranes.

Referring to FIG. 1, an example of a method for producing metallic-ceramic composite membranes is illustrated. Initially, a porous metallic substrate is received (step 102). In some implementations, reception of the porous metallic substrate can be reception of a prepared porous metallic substrate from another source whereas, in other implementations, the porous metallic substrate can be prepared as part of production of the metallic-ceramic composite membranes. The mechanical strength of the metallic substrate is advantageous relative to known ceramic substrates, which are brittle and fragile. In some implementations, the porous metallic substrate can be a macroporous, i.e., having pores with an average diameter greater than 50 nanometers. The porous metallic substrate can be formed from virtually any metal or alloy and, preferably, is formed from titanium (Ti), iron (Fe), nickel (Ni), silver (Ag), gold (Au), and/or their alloys. High corrosion resistance is desirable for the metallic-ceramic composite membrane due to its application in gaseous and/or liquid mediums. As such, in some preferred implementations, the porous metallic substrate can be formed from stainless steel, such as austenitic stainless steel. The porous metallic substrate can be thin, i.e., be less than five millimeters thick and, preferably, about two millimeters thick.

In some implementations, a macroporous austenitic stainless steel substrate can be prepared by the loose powder sintering method. For example, austenitic 316 L stainless steel powder with spherical particles ranging from 20 μm to 53 μm in diameter and a composition of 63.7% iron (Fe), 19.9% chromium (Cr), 11.3% nickel (Ni), 2.94% molybdenum (Mo), 1.61% manganese (Mn), and 0.03% carbon (C) by weight can be used to prepare the stainless steel substrate. Other elements, such as cobalt (Co), sulfur (S), and calcium (Ca), can make up about 0.50% of the austenitic 316 L stainless steel powder. The austenitic 316 L stainless steel powder can be sintered at a temperature of above 1000° C. and, preferably, 1250° C. for about one hour in an atmosphere of hydrogen and argon gas. The atmosphere can include, for example, one-quarter hydrogen gas and three-quarters argon gas. The prepared macroporous stainless steel substrate has a thickness of about two millimeters, which is optimized to be thick enough for sufficient mechanical strength in industrial applications and thin enough to be highly permeable.

Figure 2:
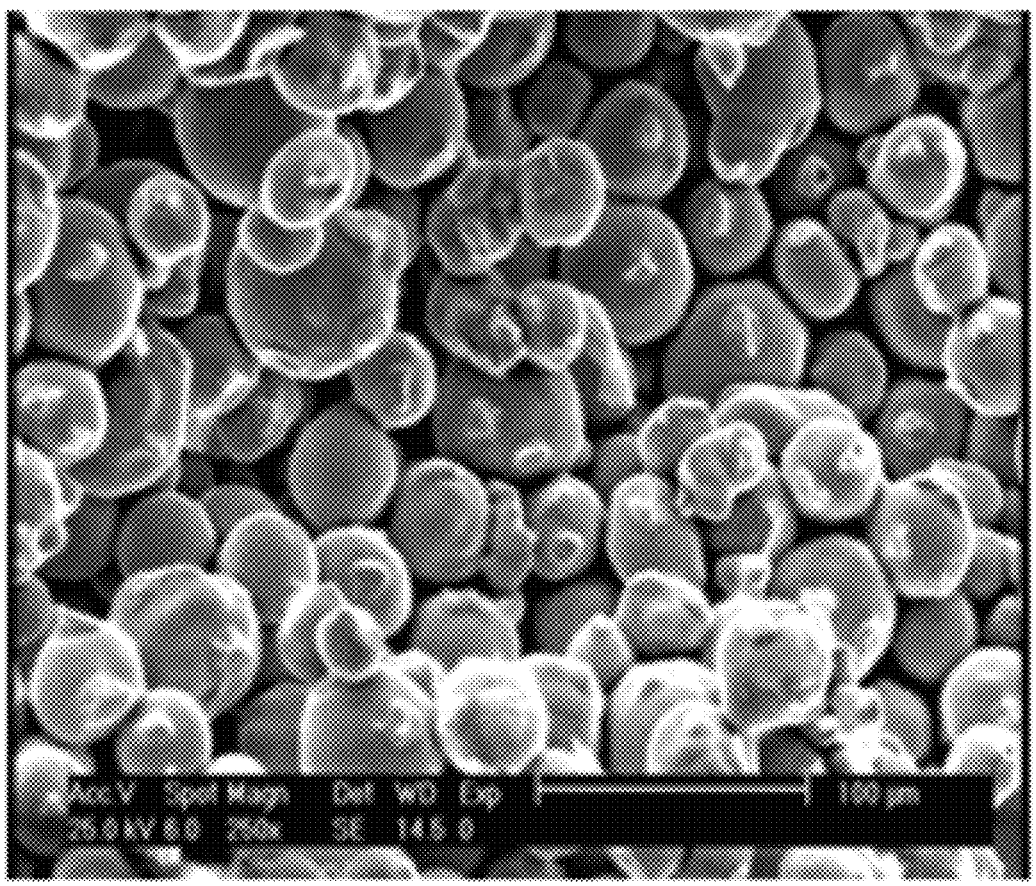
FIG. 2 illustrates a scanning electron microscopy ("SEM") image of a cross-section of a macroporous stainless steel substrate.

Referring to FIG. 2, a scanning electron microscopy ("SEM") image of a cross-section of the prepared macroporous stainless steel substrate is illustrated. As shown in FIG. 2, the stainless steel substrate has a pore size of about 10 μm to 50 μm and a porosity of about 39% calculated according the Archimedes method, which enables high permeability for composite membranes. The permeation of nitrogen gas ($N_2$) through the prepared macroporous stainless steel substrate was tested to be 0.0468 milliliters per second per centimeters squared per pascal of pressure difference $$\left(\frac{mL}{s \cdot cm^2 \cdot Pa}\right).$$

By comparison, known ceramic α-alumina substrates having a thickness of about two millimeters have a permeability of nitrogen gas of 0.001135 milliliters per second per centimeters squared per pascal of pressure difference. As such, the macroporous stainless steel substrate is about 40 times more permeable relative to known α-alumina substrates and, therefore, the transport resistance of a metallic-ceramic composite membrane supported by the prepared macroporous stainless steel substrate is lower than a completely ceramic membrane supported by a known α-alumina substrate.

Next, a first mesoporous, i.e., having pores with diameters between two and fifty nanometers, γ-alumina membrane made of gamma alumina powder is directly overlaid on the porous metallic substrate (step 104). In some implementations, to prevent the penetration of fine particles from the first mesoporous γ-alumina membrane into the porous metallic substrate, a soaking-rolling-fast drying ("SRF") method can be used to overlay the first mesoporous γ-alumina membrane. Initially, a γ-alumina solution is prepared by mixing polyvinyl alcohol ("PVOH," "PVA") and distilled water at a molar ratio of 1.00:1.25. Then, gamma alumina powder having particles with sizes ranging from 50 nm to 100 nm is added to the mixture of polyvinyl alcohol and distilled water. The solution of gamma alumina powder, polyvinyl alcohol, and distilled water is then stirred vigorously at a temperature of 90° C. until a stable colloidal solution is formed.

Then, the received porous metallic substrate is soaked, e.g., dipped and/or coated, in the γ-alumina solution for a short time, such as, for example, less than a minute and, preferably, about 30 seconds. Then, excess colloidal solution is rolled off of the surface of the soaked porous metallic substrate using a rolling pin. Next, the porous metallic substrate is dried using a fast drying method of heating the rolled porous metallic substrate to a temperature of about 70° C. This SRF process is repeated at least two times and, preferably, four times. Finally, the porous metallic substrate is calcined at a temperature above 500° C. and, preferably, about 600° C. for about three hours to directly overlay the first mesoporous γ-alumina membrane on the porous metallic substrate.

Figure 3:
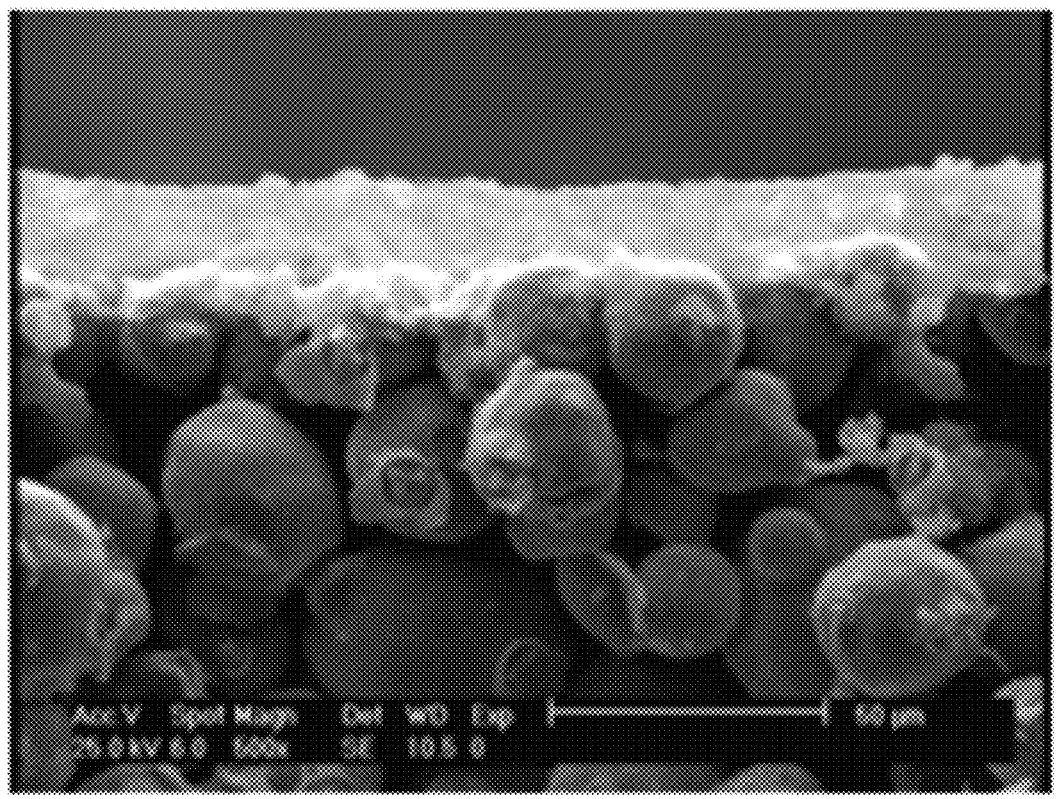
FIG. 3 illustrates an SEM image of a cross-section of a macroporous stainless steel substrate directly overlaid with a first mesoporous γ-alumina membrane.

Referring to FIG. 3, an SEM image of a cross-section of a macroporous stainless steel substrate directly overlaid with a first mesoporous γ-alumina membrane according to step 104 is illustrated. As shown in FIG. 3, a uniform, defect-free first mesoporous γ-alumina membrane is formed on the macroporous stainless steel substrate. Only partial penetration of the γ-alumina particles is observed in the pores of the macroporous stainless steel substrate because of the short soaking time of the macroporous stainless steel substrate in the γ-alumina solution and, as such, the permeability of the macroporous stainless steel substrate is substantially maintained. By rolling the excess γ-alumina solution off of the surface of the macroporous stainless steel substrate, the uniformity of the first mesoporous γ-alumina membrane was improved. Moreover, the mechanical interlocking between the macroporous stainless steel substrate and the first mesoporous γ-alumina membrane was also improved because the rolling step leads to the accumulation of γ-alumina particles in the surface pores of the macroporous stainless steel substrate. In addition, whereas known dip-coating methods would induce separation defects due to the rapid withdrawal of the macroporous stainless steel substrate from the γ-alumina solution, the rolling step results in better interfacial adhesion, which is critical in coating a ceramic membrane to a metallic substrate. Finally, the thickness of the first mesoporous γ-alumina membrane can be adjusted by altering the number of times the SRF process is repeated, such that a higher number repetitions results in a thicker membrane.

Figure 4:
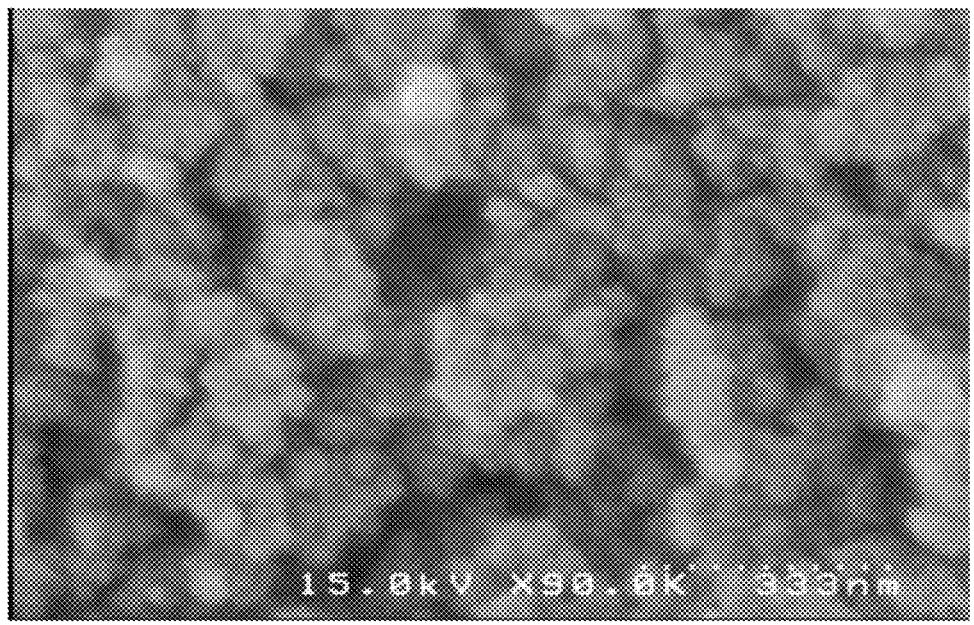
FIG. 4 illustrates a field-emission scanning electron microscopy ("FESEM") image of the surface of the first mesoporous γ-alumina membrane.

Referring to FIG. 4, a field-emission scanning electron microscopy ("FESEM") image of the surface of the first mesoporous γ-alumina membrane is illustrated. As shown in FIG. 4, the first mesoporous γ-alumina membrane has an average pore size of 30 nm. Moreover, the first mesoporous γ-alumina membrane does not have defects in its microstructure due to the relatively low temperature, i.e., about 70° C., used to fast dry the substrate. Because of its 30 nm pore size and significantly smooth surface, the first mesoporous γ-alumina membrane is suitably configured to serve as a platform for a thinner and finer mesoporous membrane. The first mesoporous γ-alumina membrane is necessary because a thinner and finer mesoporous membrane overlaid directly on the porous metallic substrate would fill in the relatively large pores of the porous metallic substrate, thereby reducing the permeability of the porous metallic substrate. In addition, the first mesoporous γ-alumina membrane also has separation characteristics because of its γ-alumina particles.

Next, a second mesoporous γ-alumina membrane made of aluminum tri-sec-butylate ("Al-tri-sec-butylate," "ATSB") is directly overlaid on the first mesoporous γ-alumina membrane (step 106). In some implementations, to improve the uniformity of the pore size and the purity of the second mesoporous γ-alumina membrane at a relatively low temperature, a sol-gel method is used to overlay the second mesoporous γ-alumina membrane. Initially, a colloidal Boehmite solution is prepared by adding aluminum tri-sec-butylate precursor, which is an aluminum alkoxide, dropwise to preheated distilled water at a molar ratio of 1:87. In some implementations, aluminum tri-sec-butoxide, aluminum sec-butoxide, aluminum ethoxide, and/or aluminum isopropoxide may be used in place of aluminum tri-sec-butylate as the precursor. The solution is then heated to about 90° C. to evaporate any butanol formed during hydrolysis of the aluminum tri-sec-butylate precursor, resulting in a colloidal Boehmite solution. The colloidal Boehmite solution is then peptized by adjusting its pH value using a strongly ionized acid, such as, for example, nitric acid ($HNO_3$), hydrochloric acid (HCl), and/or perchloric acid ($HClO_4$), to prevent agglomeration of the Boehmite particles in the colloidal solution. Next, the colloidal Boehmite solution is refluxed to ensure complete mixing and hydrolysis.

Then, to remove large agglomerates and achieve a narrower particle size distribution, the colloidal Boehmite solution can optionally be filtered. For example, the colloidal Boehmite solution can be filtered though multiple filters having pore sizes of 16 μm, 0.45 μm, and 0.2 μm, respectively. Next, a solution of polyvinyl alcohol and distilled water is added to the colloidal Boehmite solution at a 1:2 volume ratio, to prevent cracking in the second mesoporous γ-alumina membrane during subsequent drying and sintering steps.

Next, the porous metallic substrate overlaid with the first mesoporous γ-alumina membrane is coated with the colloidal Boehmite solution. In some implementations, only the side of the porous metallic substrate overlaid with the first mesoporous γ-alumina membrane can be coated with the colloidal Boehmite solution, whereas in other implementations, both sides of the porous metallic substrate overlaid with the first mesoporous γ-alumina membrane can be coated with the colloidal Boehmite solution. The dipped porous metallic substrate is then dried at a temperature less than 50° C., such as, for example, 40° C. for about 48 hours and, finally, sintered at a temperature above 500° C., such as, for example, 600° C. for about three hours. As a result, a three-layer metallic-ceramic composite membrane consisting of a second, top mesoporous γ-alumina membrane directly overlaid on a first, intermediate mesoporous γ-alumina membrane overlaid on a porous metallic substrate is formed.

Figure 5:
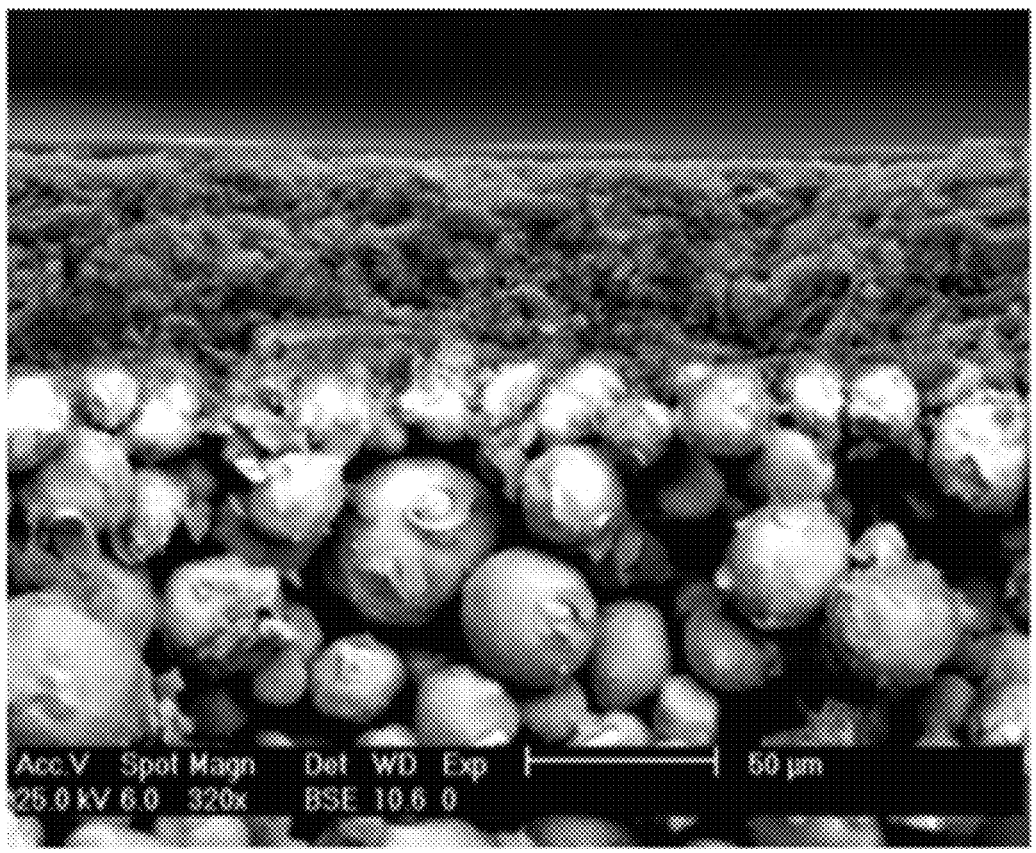
FIG. 5 illustrates an SEM image of a cross-section of a three-layer macroporous stainless steel-γ-alumina composite membrane.

Referring to FIG. 5, an SEM image of a cross-section of the three-layer macroporous stainless steel-γ-alumina composite membrane prepared according to steps 102, 104, and 106 is illustrated. As shown in FIG. 5, the three-layer structure of the macroporous stainless steel-γ-alumina composite membrane is clear with the second, top mesoporous γ-alumina membrane seen as the top thin layer.

Figure 6:
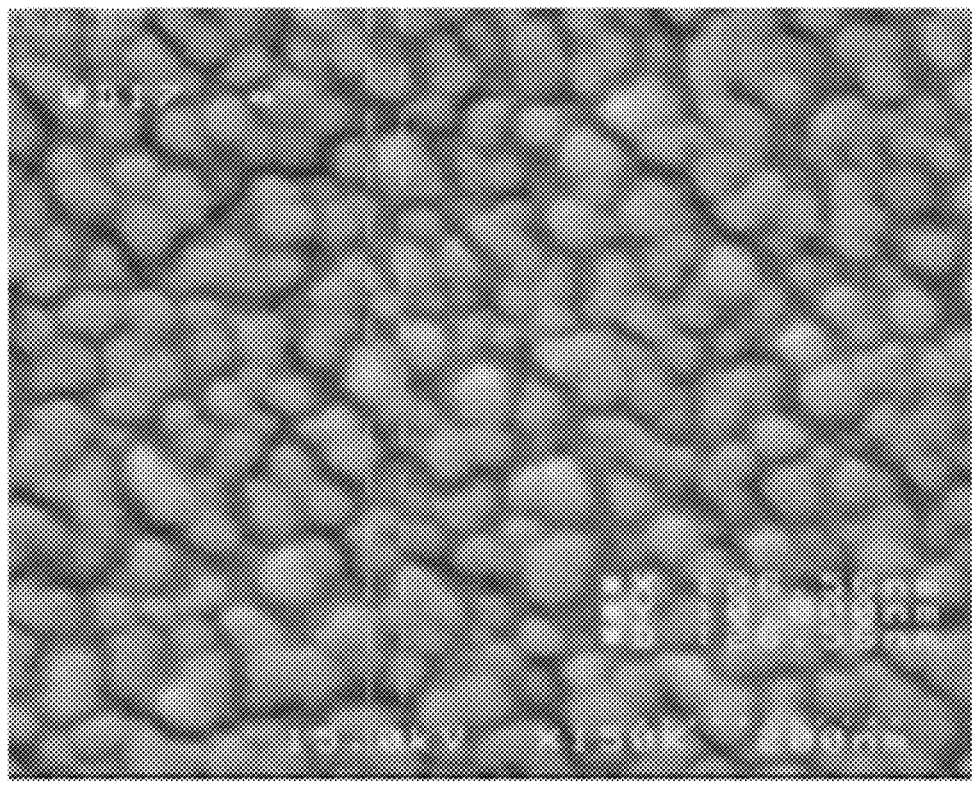
FIG. 6 illustrates an FESEM image of the surface of a second mesoporous γ-alumina membrane.

Referring to FIG. 6, an FESEM image of the surface of the second mesoporous γ-alumina membrane is illustrated. As shown in FIG. 6, the second mesoporous γ-alumina membrane does not have defects in its microstructure due to the small average size and the narrow particle size distribution of the Boehmite particles in the colloidal Boehmite solution. The porosity of the second mesoporous γ-alumina membrane was calculated to be 67.14% based on the theoretical density of γ-alumina, 3.41 gr/$cm^3$. The pore volume of the second mesoporous γ-alumina membrane is 3.301 cc/gr and the average pore size of the second mesoporous γ-alumina membrane is 2.152 nm.

The three-layer stainless steel-γ-alumina composite membrane prepared according to steps 102, 104, and 106 can be used in gas separation applications. For example, because carbon dioxide ($CO_2$) molecules are slightly larger than nitrogen ($N_2$) molecules, carbon dioxide is theoretically expected to have a lower permeability through the stainless steel-γ-alumina composite membrane. However, as tested, the measured permeability of carbon dioxide is greater than that of nitrogen due to phenomena of surface diffusion, by which the carbon dioxide molecules interact with the pore walls of the second mesoporous γ-alumina membrane and are adsorbed. This surface diffusion effect is more prominent at both lower temperatures and higher feed pressures, since the carbon dioxide surface concentration is increased. Because the metallic substrate of the stainless steel-γ-alumina composite membrane has higher mechanical strength relative to ceramic substrates, the stainless steel-γ-alumina composite membrane can be used at higher feed pressures, thereby increasing permeate flux of the gas separation system.

The metallic substrates of the metallic-ceramic composite membranes enable the joining of ceramic membranes to industrial filtering devices. In particular, because the metallic substrate can be joined to other metallic industrial parts by, for example, welding and/or brazing, the metallic-ceramic composite membranes can be quickly and economically attached and/or replaced in industrial filtering devices.

It is to be understood that the disclosed implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one implementation" or "an implementation" means that a particular feature, structure, characteristic, or function described in connection with the implementation is included in at least one implementation herein. The appearances of the phrase "in some implementations" in the specification do not necessarily all refer to the same implementation.

Accordingly, other embodiments and/or implementations are within the scope of this application.

What is claimed is:

1. A method for producing a stainless steel-γ-alumina composite membrane, comprising:
   receiving a macroporous austenitic stainless steel substrate;
   soaking the macroporous austenitic stainless steel substrate in a γ-alumina solution including gamma alumina powder, polyvinyl alcohol, and distilled water;
   rolling the surface of the macroporous austenitic stainless steel substrate soaked in the γ-alumina solution to remove excess γ-alumina solution;
   drying the rolled macroporous austenitic stainless steel substrate soaked in the γ-alumina solution in a heated environment;
   calcining the dried macroporous austenitic stainless steel substrate;
   preparing a colloidal Boehmite solution by:
      mixing an aluminum tri-sec-butylate precursor with distilled water,
      heating the mixture of the aluminum tri-sec-butylate precursor and distilled water,
      adding an acid to the heated mixture to peptize the mixture, and
      adding polyvinyl alcohol to the peptized mixture;
   soaking the calcined macroporous austenitic stainless steel substrate overlaid with the first γ-alumina membrane in the colloidal Boehmite solution;
   drying the soaked macroporous austenitic stainless steel substrate in a heated environment; and
   sintering the dried macroporous austenitic stainless steel substrate.

2. The method of claim 1, wherein the macroporous austenitic stainless steel substrate has pores with an average diameter greater than 10 micrometers.

3. The method of claim 1, wherein receiving the macroporous austenitic stainless steel substrate comprises preparing the macroporous austenitic stainless steel substrate by sintering austenitic stainless steel powder at a temperature above 1000° C.

4. The method of claim 1, further comprising:
   mixing gamma alumina powder, polyvinyl alcohol, and distilled water to prepare the γ-alumina solution.

5. The method of claim 1, wherein:
   drying the rolled macroporous austenitic stainless steel substrate soaked in the γ-alumina solution in the heated environment comprises drying the rolled macroporous austenitic stainless steel substrate soaked in the γ-alumina solution at about 70° C.; and
   calcining the dried macroporous austenitic stainless steel substrate comprises calcining the dried macroporous austenitic stainless steel substrate at a temperature above 500° C.

6. The method of claim 1, further comprising:
   filtering the peptized mixture though at least one filter having pores smaller than 0.5 μm.

7. The method of claim 1, wherein the acid is nitric acid.

8. The method of claim 1, wherein:
   drying the soaked macroporous austenitic stainless steel substrate in the heated environment comprises drying the soaked macroporous austenitic stainless steel substrate at a temperature less than 50° C.; and
   sintering the dried macroporous austenitic stainless steel substrate comprises sintering the dried macroporous austenitic stainless steel substrate at a temperature above 500° C.

9. The method of claim 1, wherein the macroporous austenitic stainless steel substrate has a thickness of about two millimeters.

* * * * *